Patented June 20, 1950

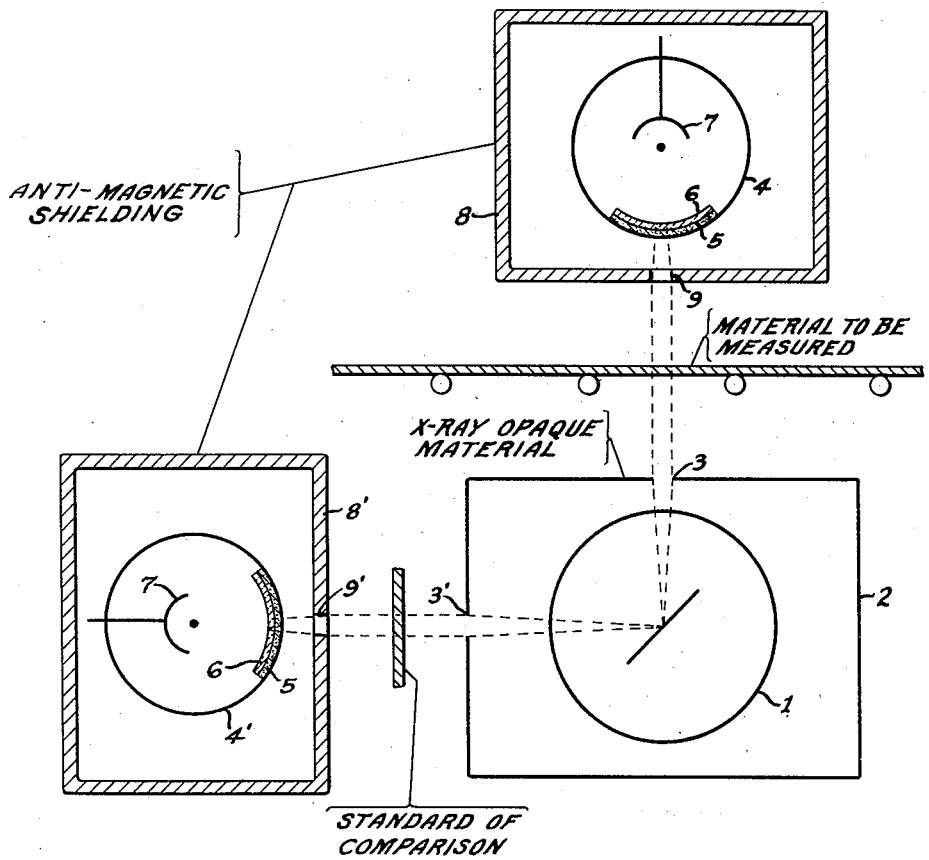

2,512,247

UNITED STATES PATENT OFFICE 2,512,247

ANTIMAGNETICALLY SHIELDED PHOTOCELL

Frederic Fua, New York, N. Y., and Robert C. Woods, Montclair, N. J., assignors to X-Ray Electronic Corporation, New York, N. Y., a corporation of New York Application August 7, 1946, Serial No. 688,896

5 Claims. (Cl. 250—239)

This invention relates to measuring or testing apparatus utilizing shielded photocells, and particularly to measuring or testing apparatus in which photocells of the electron-emitting type are shielded from magnetic influences that affect their response to incident light.

A particularly useful field for the adaptation of this invention is in X-ray measuring devices of the types disclosed in the Fua and Woods application, Serial No. 558,928, filed October 16, 1944, and in the Fua application, Serial No. 561,361, filed November 4, 1944. Photocells of the type designated as electron-emitting, electrically or magnetically focussed, contain magnetically permeable parts and the emitted electrons are subject to magnetic deflection. It has been found that their response to a given incident light may be widely varied by substantial external magnetic fields, i. e., external magnetic fields in excess of the earth's magnetic field. Hence, the accuracy and reliability of instruments employing these photocells as elements in measuring means will not be satisfactory in the presence of nearby magnetic fields whether they are willfully or accidentally generated, unless the influence of such fields is controlled.

Magnetic flux can be controlled by shields of magnetic material or by non-magnetic conducting shields having low resistivity. Shields of magnetic material operate by short-circuiting the flux lines that tend to pass through the shield, and hence have an effectiveness that depends upon their thickness or magnetic permeability at low flux densities. Conducting shields operate by taking advantage of the fact that, when magnetic flux cuts across a conductor, eddy currents are produced which oppose the penetration of the flux through the conductor. Thus by inclosing the space to be protected with a silver, copper or aluminum box, alternating magnetic fields will be prevented from penetrating through the conducting walls of the box. To be effective, conducting shields must be of low-resistance material and must be relatively thick. Conducting shields that are effective as electrostatic shields, for example of brass or thin aluminum, are quite ineffective as anti-magnetic shields and will not insure satisfactory accuracy in measuring instruments.

For example, in a steel mill, as is well known, the processes of rolling, extruding or forging steel often produce in the metal under treatment a structure which is more or less magnetic. Moreover, iron and steel tools used by workmen in electrical work, or in the presence of the strong electrical fields existing in most modern factories, quite often become magnetized. If an X-ray measuring device employing photocells not shielded anti-magnetically according to this invention is used in association with such a metalworking process or near such tools, an unpredictable error will be introduced into the readings taken from it.

We have illustrated our invention in connection with such an X-ray measuring instrument applied to the measurement of the thickness of rolled steel. By means of this invention, notwithstanding the strong and erratic fields present in a rolling mill, we are able to achieve a linearity of photocell response permitting variations in the thickness of the rolled material of an order less than one per cent to be quantitatively detected reliably and accurately.

Such an embodiment of our invention is described in detail in the drawing which illustrates it diagrammatically.

As shown in the drawings, a source of X-ray 1, disposed in a housing 2 of X-ray opaque material, is so arranged as to discharge X-ray beams through the limited apertures 3 and 3'. One of these beams 3' passes through the material to be measured, i. e. a web of steel emerging from a rolling mill, and the other beam 3' through a standard of comparison, i. e. a web of the same composition of known thickness.

Disposed beyond the material to be measured and beyond the standard of comparison respectively are two photocells 4 and 4'. These photocells are preferably constructed according to the disclosure of the Fua and Woods application, Serial No. 658,903, filed April 2, 1946 and now abandoned, having deposited on the inner wall of their envelope tubes a fluorescent layer 5 and having an X-ray opaque, light transparent screen 6 superimposed on layer 5, so that an X-ray beam falling on the fluorescent material will cause it to fluoresce, but will not penetrate to the photo-sensitive cathode 7.

These photocells 4 and 4' are encased in anti-magnetic shielding boxes 8 and 8', respectively, which contain apertures 9 and 9', respectively, of a size to admit to the photocells 4 and 4' the X-ray traversing the material to be measured and the standard of comparison, respectively.

The boxes 8 and 8' are constructed of a ferromagnetic material, for example, steel, or of a highly conductive material such as pure copper. The composition of this material, if ferro-magnetic, is selected in correlation with the desired thickness of the walls of the boxes 8 and 8' to have a magnetic permeability affording effective shielding of the photocell. We have found, for example, in an installation of the type described that employs a one-hundred kilovolt X-ray generator and is installed in a regular commercial rolling mill, that an effective shielding box can be built of magnetically soft steel and a thickness of three-quarters of an inch. If a conductive-type of shielding is used, especially if the use of silver is to be avoided, relatively greater thickness is required to secure effective anti-magnetic shielding.

While for the purpose of clarity and completeness, we have described our invention in connection with details of a particular embodiment thereof, it is not our intention to be limited to such details, but rather to the scope of the appended claims.

We claim:

1. In measuring or testing apparatus for use in an environment of substantial external magnetic fields and including a source of penetrating radiant energy and a photocell of the electron-emitting type positioned to respond to radiant energy from said source but located at sufficient distance from said source to provide a space to receive material to be measured or tested; the improvement which comprises anti-magnetic shielding substantially surrounding said photocell to insure that the response thereof is not affected by the external magnetic fields.

2. In measuring or testing apparatus for use in an environment of substantial external magnetic fields and including a source of penetrating radiant energy and a photocell of the electron-emitting type positioned to respond to radiant energy from said source but located a sufficient distance from said source to provide a space to receive material to be measured or tested; the improvement which comprises anti-magnetic shielding of high electrical conductivity and relatively great thickness substantially surrounding said photocell to insure that the response thereof is not affected by the external magnetic fields.

3. In measuring or testing apparatus for use in an environment of substantial external magnetic fields and including a source of penetrating radiant energy and a photocell of the electron-emitting type positioned to respond to radiant energy from said source but located a sufficient distance from said source to provide a space to receive material to be measured or tested; the improvement in which the photocell is substantially encased in a shielding of a ferro-magnetic material to insure that the response thereof is not affected by the external magnetic fields.

4. In measuring or testing apparatus for use in an environment of substantial external magnetic fields and including a source of penetrating radiant energy and a photocell of the electron-emitting type positioned to respond to radiant energy from said source but located a sufficient distance from said source to provide a space to receive material to be measured or tested; the improvement in which the photocell is substantially encased in a shielding of magnetically soft steel approximately three-quarters of an inch thick to insure that the response thereof is not affected by the external magnetic fields.

5. In measuring or testing apparatus for use in an environment of substantial external magnetic fields including a source of X-rays, a first photocell of the electron-emitting type positioned to respond to X-rays from said source but located a sufficient distance from said source to provide a space for a standard of comparison and a second photocell of the electron-emitting type positioned to receive X-rays from said source but located a sufficient distance from said source to provide a space to receive material to be measured or tested; the improvement which comprises anti-magentic shielding substantially surrounding each of said photocells to prevent material variation in the response of said photocells to incident light due to the presence of said external magentic fields.

FREDERIC FUA.
ROBERT C. WOODS.

REFERENCES CITED

The following references are of record in the file of this patent:

UNITED STATES PATENTS

| Number | Name | Date |
|---|---|---|
| 1,552,679 | Crites | Sept. 8, 1925 |
| 1,855,863 | McCreary | Apr. 26, 1932 |
| 2,193,590 | Gulliksen | Mar. 12, 1940 |
| 2,343,630 | Atwood, Jr. | Mar. 7, 1944 |